United States Patent [19]

Matjukhina et al.

[11] Patent Number: 4,931,713
[45] Date of Patent: Jun. 5, 1990

[54] RECTIFIER ELECTRIC DRIVE

[75] Inventors: Ljudmila I. Matjukhina; Alexandr S. Mikhalev; Sergel N. Sidoruk; Igor M. Chushenkov, all of Minsk, U.S.S.R.

[73] Assignee: Belorussky Gosudarstvenny Universitet Imeni V.I. Lenina, Minsk, U.S.S.R.

[21] Appl. No.: 302,598
[22] PCT Filed: May 14, 1987
[86] PCT No.: PCT/SU87/00055
  § 371 Date: Jan. 13, 1989
  § 102(e) Date: Jan. 13, 1989
[87] PCT Pub. No.: WO88/09081
  PCT Pub. Date: Nov. 17, 1988
[51] Int. Cl.⁵ .............................................. H02P 5/28
[52] U.S. Cl. .................................... 318/632; 318/254; 318/138; 318/439; 318/803
[58] Field of Search .................. 318/700-724, 318/632, 800-812, 741-744, 757, 758, 759, 760, 761, 762, 763, 764, 254, 138, 439, 599

[56] References Cited

U.S. PATENT DOCUMENTS 4,250,435 2/1981 Alley .
4,270,074 5/1981 Duckworth .

FOREIGN PATENT DOCUMENTS 1029368 7/1983 U.S.S.R. .
1144201 7/1985 U.S.S.R. .
1244779 7/1986 U.S.S.R. .

Primary Examiner—William M. Shoop, Jr.
Assistant Examiner—Paul Ip
Attorney, Agent, or Firm—Lilling & Greenspan

[57] ABSTRACT

A rectifier electric drive has a synchronous machine shaft position transmitter (2) which is electrically connected to an output of a permanent storage (10). The output bus of this storage (10) is connected to control inputs (11) of code-to-pulse duration converters (12) whose number is equal to the number of windings of the synchronous machine (1). The outputs of the code-to-pulse duration converter (12) are connected to pulse duration master inputs (17) of respective switching devices (18) having their pulse polarity master inputs (26) connected to respective outputs of the permanent storage (10). The outputs of the switching device (18) are connected to the windings of the synchronous machine (1). Also provided is a voltage to pulse repetition period conversion unit (34) having its input (35) connected to a voltage source (25) and also connected to the switching devices (18). The input (33) of the voltage to pulse repetition period conversion unit is also connected to the output of the master oscillator (32) and connected to an input (31) of a controlled frequency divider (28), and its output is connected to triggering inputs (36) of the code-to-pulse duration converters (12). The control input (29) of the frequency divider (28) receives a control signal modulus code and the output of the divider (28) is connected to pulse frequency master inputs (30) of the converters (12).

2 Claims, 2 Drawing Sheets

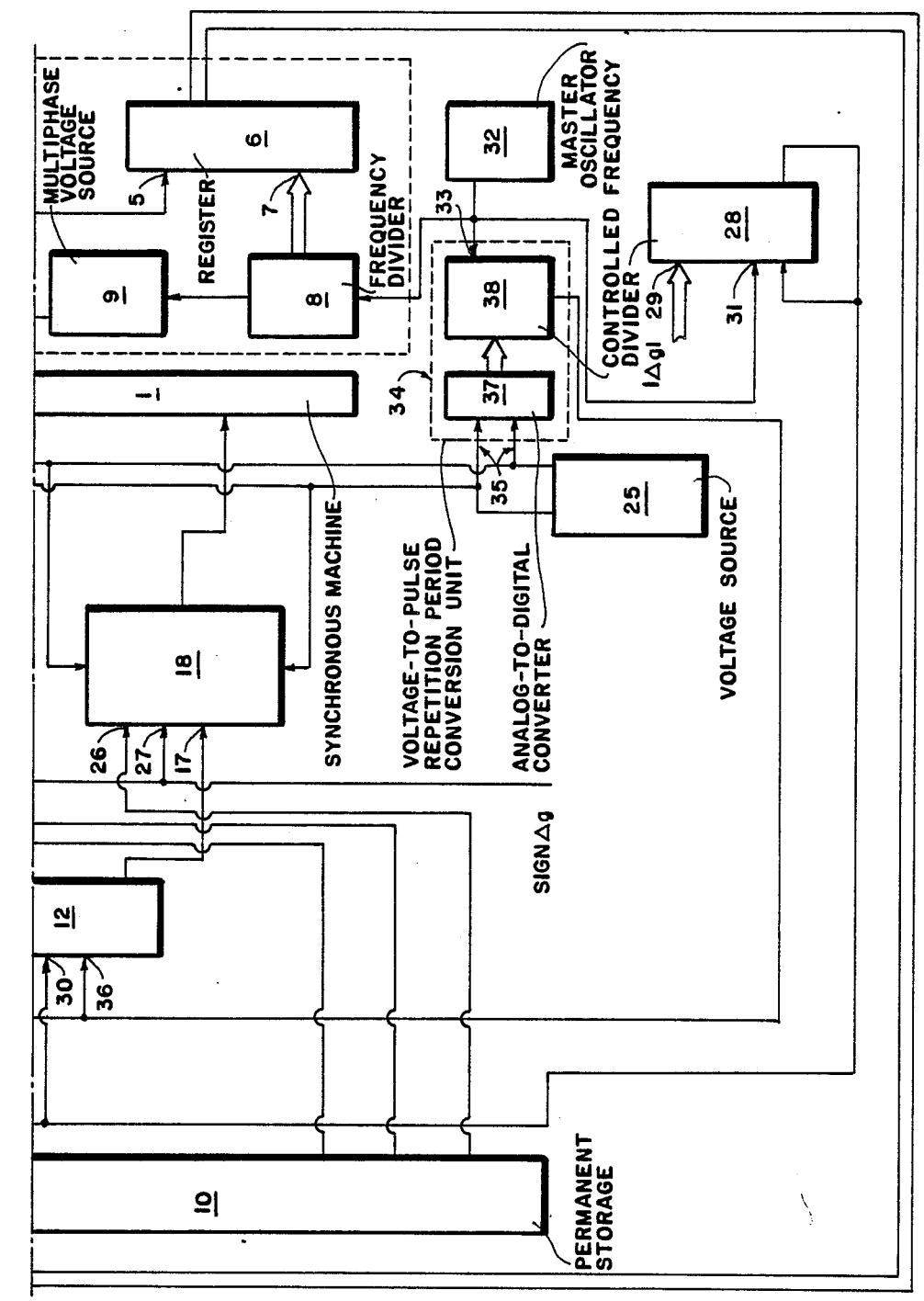
FIG.IA

RECTIFIER ELECTRIC DRIVE

BACKGROUND OF THE INVENTION

1. Field of the Invention

The invention relates to electric machines, and more particularly, it relates to rectifier electric drives incorporated in numerically or digitally controlled actuating mechanisms for various applications.

2. Description of the Prior Art

High reliability of synchronous machines and flexibility of their control have opened up broad horizons for their use in high-precision rectifier drives of automation devices which are currently widely employed in various technologies.

However, the hitherto known rectifier electric drives are devoid of means for compensating for pulsation of the driving torque caused by fluctuations of the supply voltage, varying impedance of the supply circuits, the finiteness of the impedance of real-life voltage sources, and reversal of the rotation of the drive. This narrows down the speed control range and steps up pulsation of the speed. Moreover, the flatness of mechanical characteristics is affected, which complicates the control of the position and speed of a synchronous machine.

There is known a rectifier electric drive (SU, A, 1144201) comprising a synchronous machine with a shaft position transmitter, a permanent or fixed storage having its address inputs connected with the outputs of a control unit and its corresponding outputs connected with the inputs of comparison circuits or comparators equal in number to the number of the windings of the synchronous machine. The outputs of the comparators are connected with a switching device connecting the windings of the synchronous machine to a voltage source. However, in this system the range of angular speed control is limited because of variations of the torque at reversing, the absence of means for compensating for pulsation and drift of the supply voltage, and the varying frequency of pulse-width modulation of the voltage across the windings of the synchronous machine. Furthermore, because of the finiteness of the impedance of the voltage source in a real-life electric drive, the flatness of this system's mechanical characteristics is not adequately high.

The above shortcomings are partly eliminated in a rectifier electric drive (SU, A, 1244779) comprising a synchronous machine provided with a shaft position transmitter having its output electrically connected with an address input of a permanent storage having recorded therein the code of duration and polarity of supply pulses fed to the windings of the synchronous machine, the output bus of the storage being connected to the control inputs of code-to-pulse duration converters which are equal in number to the number of the windings of the synchronous machine, the outputs of the converters being connected to the pulse duration master inputs of a switching device whose pulse polarity master inputs are connected to the respective outputs of the permanent storage, the master inputs of the polarity of the control signal being united and adapted to receive a signal governing the polarity of the control signal, and the outputs being connected to the windings of the synchronous machine. This drive further comprising a master oscillator having its output connected to the input of a controlled frequency divider whose control input is adapted to receive a code of the modulus of the control signal and whose output is connected to the master inputs of pulse frequency of the code-to-pulse duration converters. A voltage source is connected to the switching device.

In the last-described rectifier electric drive variations of the output torque value still occur at reversing and on account of the absence of means for compensating for pulsation and drift of the supply voltage. They are, however, smaller than in the previously described rectifier drive, owing to the permanence of the frequency or repetition rates of the pulses supplying the windings. Furthermore, on account of the finiteness of the impedance of the voltage source, the flatness of the mechanical characteristics of the electric drive is not adequately high.

SUMMARY OF THE INVENTION

It is an object of the present invention to create a rectifier electric drive providing for elimination of pulsation of the torque of the synchronous machine.

With this object in view, the essence of the invention resides in a rectifier electric drive comprising a synchronous machine provided with a shaft position transmitter having its output electrically connected with an address input of a permanent storage storing therein the codes of duration and polarity of power supply pulses to be fed to the windings of the synchronous machine; the output bus of the permanent storage being connected to the control inputs of code-to-pulse duration converters in which are equal in number to the number of the windings of the synchronous machine; the outputs of the code-to-pulse duration converters being connected to the pulse duration master inputs of switching devices in which are equal in number to the number of the windings of the synchronous machine, the pulse polarity master inputs of the switching devices are connected to the respective outputs of the permanent storage, the control signal polarity master inputs of the switching devices are united and adapted to receive a signal governing the polarity of the control signal, and the outputs of the switching devices are connected to the windings of the synchronous machine; the pulse frequency master inputs of the code-to-pulse duration converters are connected to the output of a controlled frequency divider having its input connected to the output of a master oscillator and having its control input adapted to receive a code of the modulus of the control signal; the triggering inputs of the code-to-pulse duration converters are connected to the output of a voltage-to-pulse repetition period conversion unit having its first input connected to a voltage source and its second input connected to the output of the master oscillator; and a voltage source is also connected to the switching devices.

It is expedient that in the rectifier electric drive the voltage-to-pulse repetition period conversion unit should include an analog-to-digital converter having its input serving as the first input of the voltage-to-pulse repetition period conversion unit, and a controlled frequency divider having its control input connected to the output of the analog-to-digital converter, its other input and output serving, respectively, as the second input and output of the voltage-to-pulse repetition period conversion unit.

The herein disclosed rectifier electric drive provides for elimination of pulsation of the torque of the synchronous machine caused by fluctuation of the output voltage of the voltage source, thus allowing greater range of control of the speed of the synchronous machine with lower pulsation of this speed. Furthermore, the enhanced flatness of the characteristics of the rectifier drive simplifies both the control of the angular position of the shaft of the synchronous machine and control of its rotational speed.

BRIEF DESCRIPTION OF DRAWING

FIGS. 1 and 1A show a functional block-unit diagram of the rectifier electric drive constructed in accordance with the invention.

DESCRIPTION OF PREFERRED EMBODIMENT

Figure 1:
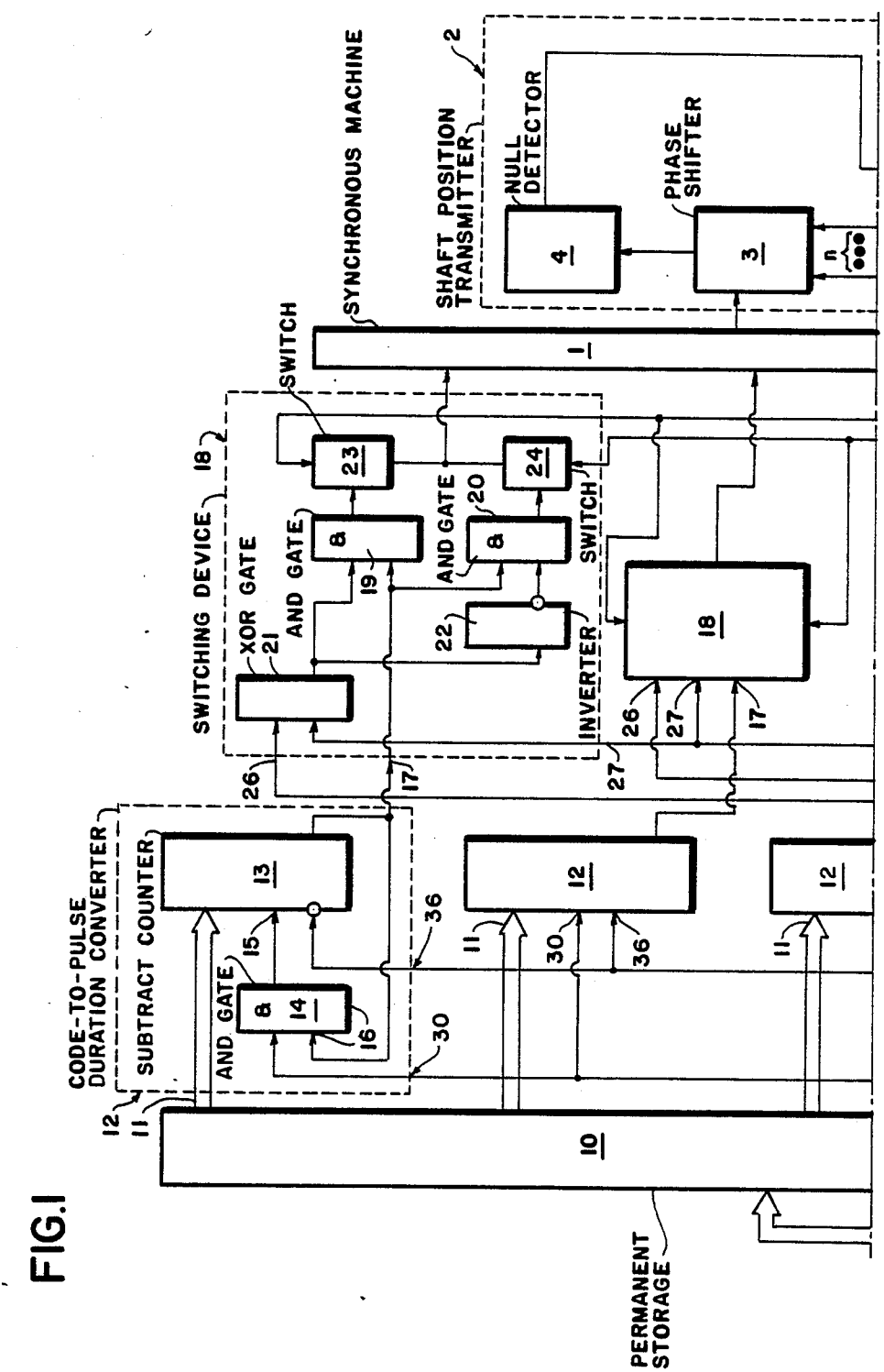

The rectifier electric drive comprises a synchronous machine 1 (FIG. 1) provided with a transmitter 2 of the angular position of its shaft. In the embodiment being described the shaft angle transmitter is of the digital kind, including a phase shifter 3 having its output connected to the input of a null detector 4 connected by its output 5 to the write access input of a register 6 whose data input 7 is connected to the output of a frequency divider 8, e.g. of the type including a summation counter. The other output of the frequency divider is connected to the input of a multiphase voltage source 9 whose "n" outputs are connected to the inputs of the phase shifter 3.

The output of the shaft angular position transmitter 2, which is the output of the register 6, is connected to the address input of a permanent storage 10 where codes of the duration and polarity of the power supply pulses of the synchronous machine 1 are stored. When the shaft angular position transmitter used has an analog output signal, it is electrically connected with the input of the permanent storage 10 through an analog-to-digital converter.

The output bus of the permanent storage 10 is connected to the control inputs 11 of a plurality of code-to-pulse duration converters 12 whose number equals the number of the windings of the synchronous machine, this number in the presently described embodiment being three. Each converter 12 in the presently described embodiment includes a subtract counter 13 whose reset (adjusting) input serves as the control input 11 of the converter 12, and a two-input logical AND gate 14 whose output is connected to the subtract (count-down) input 15 of the subtract counter 13. The inverting borrow output of the subtract counter 13 is connected to the input 16 of the logical AND gate 14 and serves as the output of the converter 12. For better clarity of the block-unit diagram in the appended drawing, the circuitry of only one of the three converters 12 is shown.

The respective outputs of the converters 12 are connected to the pulse duration master inputs 17 of the switching devices 18 whose number likewise equals the number of the windings of the synchronous machine 1. Each switching device 18 in the presently described embodiments includes two two-input logical AND gates 19, 20 whose respective first inputs are united and serve as the input 17 of the switching device 18. The second input of the AND gate 19 is connected to the output of a logical "exclusive OR" (XOR) gate 21 also connected to the input of an inverter 22. The latter has its output connected to the second input of the AND gate 20. The outputs of the AND gates 19, 20 are connected to the control units of switches 23, 24 whose power inputs are connected to a voltage source 25, while their outputs are united and serve as the output of the switching device 18 connected to the respective winding (not shown) of the synchronous machine 1.

The first input of the "exclusive OR" gate 21 serves as the pulse polarity master input 26 of the switching device 18, connected to the respective output of the permanent storage 10, its second input serving as the control signal polarity master input adapted to receive a signal representing the polarity sign of the control signal—sign $\Delta g$. The respective control signal polarity master inputs 27 of the switching devices 18 are united. For better clarity of the block-unit diagram of the rectifier drive in the appended drawing, the circuitry of only one switching device 18 is shown there.

The disclosed rectifier electric drive further comprises a controlled frequency divider 28 which in the presently described embodiment includes a subtract counter whose reset (adjusting) input serves as the control input 29 of the frequency divider 28. The control input 29 is adapted to receive a code of the modulus $|\Delta g|$ of the control signal. The output of the controlled frequency divider 28 which in the presently described embodiment is the borrow output of the subtract counter connected to its write input, is connected to the pulse frequency master inputs 30 of the respective code-to-pulse duration converters 12. The input 30 in the presently described embodiment is the second input of the respective logical AND gate 14. The input 31 of the controlled frequency divider 28 which in the previously described embodiment is the subtract counter is connected to the output of a master oscillator 32.

The output of the master oscillator 32 is further connected to the input 33 of a voltage-to-pulse repetition period conversion unit 34 whose other input 35 is connected to the voltage source 25 and whose output is connected to the triggering inputs 36 of the respective code-to-pulse duration converters 12. The input 36 in the presently described embodiment is the write input of the respective subtract counter 13.

The voltage-to-pulse repetition period conversion unit 34 which, in fact, serves as a feedback connection in the disclosed rectifier drive, includes an analog-to-digital (A-D) converter 37 whose input serves as the input 35 of the converter unit 34, and a controlled frequency divider 38 whose control input is connected to the output of the A-D converter 37, while its other input and output serve, respectively, as the input 33 and output of the conversion unit 34.

The controlled frequency divider 38 can be of a structure similar to the above described controlled frequency divider 28, i.e. it can include a subtract counter whose borrow input is connected to the write input.

As the circuitry of the presently described embodiment of the shaft angular position transmitter 2 includes the frequency divider 8, the incorporation of a pulse generator becomes mandatory. Therefore, the pulse generator in the presently described embodiment is in the form of the master oscillator 32 whose output is connected to the input of the frequency divider 8.

The disclosed rectifier electric drive operates as follows. The frequency divider 8 of the transmitter 2 of the shaft angular position of the synchronous machine 1 divides the frequency $f_o$ of the master oscillator 32 by $2^n$ where "n" is the number of the digits of the counter. Upon receiving the output signal of the divider 8, the multiphase voltage source 9 shapes phase-shifted, e.g. sine-wave, signals at a frequency of $f_o/2^n$, which signals go to the multiphase winding of the phase shifter 3 whose rotor is joined to the shaft (not shown) of the synchronous machine 1. The output signal of the phase shifter 3 is sent to the null detector 4, which shapes square pulses at its output. The leading edges of these pulses coming to the input 5 of the register 6 are used to write in the code of the angular position of the shaft from the divider 8 into the register 6. This code is determined by the angular position of the rotor of the synchronous machine 1 and governs the orientation of the magnetic flux of its stator, e.g. perpendicular to the magnetic flux of the rotor, which amounts to the maximum output torque of the synchronous machine 1. The shaft position code is sent to the address input of the permanent storage 10 where pulse duration codes $N_i$ (where "i" is the consecutive number of the phases) of power supply are stored for the respective three phases of the synchronous machine 1, as well as polarity codes for these pulses, ensuring perpendicularity of the magnetic fluxes of the stator and rotor for any position codes written in the register 6, as well as minimized pulsation of the output torque of the drive. These K-digit pulse duration codes $N_i$ of power supply are introduced into the subtract counters 13 of the code-to-pulse duration converters 12, the frequency (f) or rate of introduction being:

$$f = f_o/K_U, \qquad /1/$$

where $K_U$ is the voltage code at the output of the A-D converter 37 of the voltage-to-pulse repetition period conversion unit 34. Expression /1/ is implemented by reducing the frequency $f_o$ of the master oscillator 32 $K_U$ times said reduction being performed by the controlled frequency divider 38 of the conversion unit 34.

The introduction of a code into the subtract counters 13 is governed by the leading edge of the output signal of the controlled frequency divider 38 coming to the write input 36 of the respective converter 12. With the codes written in, the borrow outputs of the counters 13 feed out logical "1" signals triggering power supply pulses sent to the respective windings. Logical "1" signals are also fed to the inputs 16 of the logical AND gates, thus letting pulses coming from the output of the controlled frequency divider 28 pass to the count-down inputs 15 of the counters 13. The frequency or repetition rate of these pulses equals $f_o/|\Delta g|$, where $|\Delta g|$ is the modulus code of the control signal coming to the control input 29 of the divider 28 from an external control. Therefore, the borrow outputs of the subtract counters 13 would feed out "1" signals for time periods $t_i$ equalling:

$$t_i = N_i \cdot |\Delta g|/f_o. \qquad /2/$$

When the code at the output of the respective subtract counter 13 is reduced to zero, the borrow signal changes to logical "0", blocking the passage of pulses to the count-down inputs of the counter 13 through the respective AND gate 14.

The synchronous machine 1 is reversed by inverting the polarity of the power supply pulses fed to the windings of the synchronous machine 1, coming from the respective outputs of the permanent storage 10, with the aid of the logical "exclusive OR" gates 21 of the switching devices 18. As a result of the inverting, with a change of the polarity of the control signal sign $\Delta g$, signals coming from the outputs of the respective converters 12 to the pulse duration master inputs of the switching devices 18, which have been previously coming e.g. to the switches 23 through the logical AND gates 19, would now come to the control inputs of the switches 24 through the logical AND gates 20. Thus, the windings of the synchronous machine would be connected to the opposite poles of the voltage source 25, allowing inversion of the output torque of the synchronous machine 1 at reversing without varying its modulus, thus eliminating a variation of the torque.

As the frequency or repetition rate of power supply pulses fed to the windings of the synchronous machine 1 equals "f" from expression /1/, by introducing expression /2/, the mean voltage value across the i-th winding ($U_i$) is governed by the expression:

$$U_i = t_i \cdot f \cdot U = \frac{N_i \cdot |\Delta g| \cdot f}{f_o} \cdot U = \frac{N_i \cdot |\Delta g|}{K_U}, \qquad /3/$$

where U is the output voltage of the source 25.

Therefore, the mean voltage of power supply of the i-th (the value $U_i$) is independent of the power supply voltage U (provided $U_1 < U$). Hence, neither pulsation nor drift of the value U always taking place at the output of the voltage source 25 which is an AC to DC converter by way of rectification and filtration would influence the output torque of the synchronous machine 1.

The voltage source 25 would also have finite source impedance, and because of the voltage drop across it as the current flows, the voltage supplied to the windings of the synchronous machine is reduced. However, owing to the incorporation in the disclosed rectifier drive of the voltage-to-pulse repetition period conversion unit 34, the repetition period of the power supply pulses fed to the windings is reduced in accordance with expression /1/, so that the load torque has less influence on the rotational speed of the synchronous machine 1, i.e. the flatness of the mechanical characteristics of the rectifier electric drive is enhanced. Moreover, the enhanced flatness of the mechanical characteristics cuts the electromechanical time constant of the rectifier drive, simplifying the control of its angular position and speed.

This invention can be used in digitally controlled actuating devices for a wide spectrum of purposes.

We claim:

1. A rectifier electric drive comprising:
    a synchronous machine (1) having windings and being provided with a shaft position transmitter (2), said shaft position transmitter (2) having an output;
    a permanent storage (10) containing codes of duration and polarity of power supply pulses of said windings of said synchronous machine (1), said permanent storage (10) having an address input, outputs and an output bus, said output of said shaft position transmitter (2) being electrically connected to said address input of said permanent storage (10);
    a plurality of code-to-pulse duration converters (12) equal in number to the number of windings of said synchronous machine (1), each said code-to-pulse duration converter (12) having a control input (11), an output, a pulse frequency master input (30), and a triggering input (36), said output bus of said permanent storage (10) being connected to said control inputs (11) of said code-to-pulse duration converters (12);
    a plurality of switching devices (18) equal in number to the number of windings of said synchronous machine (1), each said switching device (18) having a pulse duration master input (17), a pulse polarity master input (26), and a control signal polarity master input (27), said outputs of said code-to-pulse duration converters (12) being connected to said pulse duration master inputs (17) of said switching devices (18), said pulse polarity master inputs (26) of said switching devices (18) being connected to said respective outputs of said permanent storage (10), said control signal polarity master inputs (27) of said switching devices (18) being joined to each other and provided with means to receive a polarity signal of a control signal, and said outputs of said switching device (18) being connected to said windings of said synchronous machine (1);

a master oscillator (32) having an output;

a controlled frequency divider (28) having an input (31), a control input (29), and an output, said output of said master control oscillator (32) being connected to said input (31) of said controlled frequency divider (28), said control input (29) of said controlled frequency divider (28) receiving a control signal modulus code, and said output of the controlled frequency divider (28) being connected to said pulse frequency master inputs (30) of said code-to-pulse duration converters (12);

a voltage source (25) connected to said switching devices (18); and a voltage-to-pulse repetition period conversion unit (34) having a first input (35), a second input (33), and an output, said first input (35) of said voltage-to-pulse-repetition period conversion unit (34) being connected to said voltage source (25), said second input (33) of said voltage-to-pulse-repetition period conversion unit (34) being connected to said output of said master oscillator (32), and said output of said voltage-to-pulse-repetition period conversion unit (34) being connected to said triggering inputs (36) of said code-to-pulse duration converter (12).

2. A rectifier electric drive as claimed in claim 3, wherein said voltage-to-pulse repetition period conversion unit (34) includes an analog-to-digital converter (37) having an input and an output, said input of said analog-to-digital converter (37) serving as said first input (35) of said voltage-to-pulse repetition period conversion unit (34), and a controlled frequency divider (38) having a control input, an input, and an output, said control input of said controlled frequency divider being connected to said output of said analog-to-digital converter (37), said input and output of said controlled frequency divider serving, respectively, as said second input (33) and said output of said voltage-to-pulse repetition period conversion unit (34).

* * * * *